Patented Apr. 25, 1950

2,505,234

UNITED STATES PATENT OFFICE 2,505,234

VAT DYES OF BENZANTHRONE DIACRIDINE SERIES

Joseph Deinet, Glassboro, N. J., assignor to E. I. du Pont de Nemours & Company, Wilmington, Del., a corporation of Delaware No Drawing. Application March 10, 1948, Serial No. 14,150

5 Claims. (Cl. 260—274)

This invention relates to a class of new vat dyestuffs. More particularly it relates to new vat dyestuffs of the benzanthronylaminoanthraquinone acridine series probably containing two acridine rings.

In United States Patent 995,936 dyestuffs are prepared by condensing Bz-1-bromobenzanthrone with 1-amino-anthraquinone and fusion of the condensation product with caustic alkali. The resulting color is thought to have the formula:

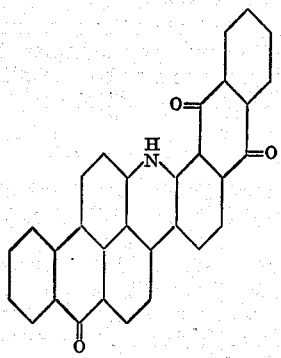

Because of the good fastness properties of this dyestuff, new dyestuffs have been produced by further substitution of this molecule. Subsequent patents have issued in which various substituents have been introduced either in the anthraquinone or benzanthrone nucleus.

It is the object of this invention to produce a class of new vat dyestuffs having novel shades and superior fastness. It is a further object of this invention to produce a class of vat dyestuffs which has a novel structure probably containing two acridine rings.

I have found that these objects may be accomplished by fusing with caustic alkali, compounds of the following general formula:

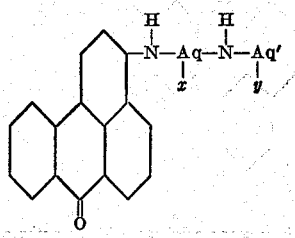

wherein Aq is an anthraquinone radical having the two N-atoms in alpha positions, Aq' is an anthraquinone radical, and $x$ and $y$, which are ortho to the N-atom connecting Aq and Aq', are dissimilar substituents of the group consisting of a hydrogen atom and a methyl radical.

Such intermediate compounds may be synthesized by any convenient process known to those skilled in the art. In general they may be produced by condensation of Bz-1-bromobenzanthrone with an alpha, alpha-diamino anthraquinone and further condensation with an anthraquinone compound having a methyl and a halogeno substituent in ortho positions. Alternatively the intermediate may be produced by condensation of Bz-1-bromobenzanthrone with a suitable alpha, alpha-diamino, beta-methyl-anthraquinone and further condensation with a halogenated anthraquinone.

During the caustic alkali fusion the usual benzanthronylaminoanthraquinone acridine ring closure probably occurs as in United States Patent 995,936 and in addition a new ring system is probably formed between Aq and Aq' by further condensation. The products are of superior fastness and show different color reactions from the corresponding anthrimides, i. e., compositions having an aminoanthraquinonyl radical attached to the anthraquinone portion of the compound of United States Patent 995,936. The dyestuffs so produced in all probability contain two acridine rings. Furthermore, it can be shown that the caustic alkaline fusion may be carried out stepwise in such a manner to indicate that first one and then the other acridine ring is formed. However, a formula for this class of dyestuffs cannot definitely be proved, and I do not intend to limit this invention by any particular theoretical formula that might be depicted. For the purpose of general description, however, the following formula may be considered as representing the class of dyestuffs having two acridine nuclei formed by the above-described alkali fusion:

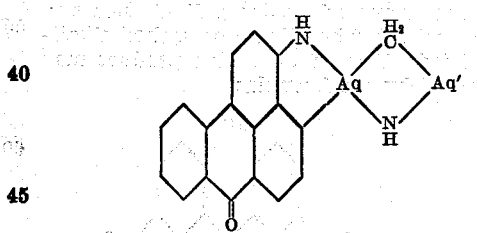

in which Aq is an anthraquinone radical substituted by the N-atoms in two of its alpha positions and Aq' is an anthraquinone radical substituted by the N-atom and the C-atom in ortho positions.

The following examples are given to illustrate the invention. All parts given are by weight.

*Example 1*

A mixture of 772 parts of nitrobenzene, 154.5 parts of Bz-1-bromobenzanthrone, 119 parts of 1:5-diaminoanthraquinone, 77.5 parts of sodium carbonate and 7.7 parts of copper acetate is heated to 170° to 172° C. and maintained at that temperature for 20 hours. Then 600 parts of nitrobenzene, 151 parts of 2-bromo-3-methylanthraquinone, 75 parts of sodium carbonate and 3.8 parts of copper acetate are added. The mixture is heated to 210° C. and maintained at that point for 20 hours. After removal of the solvent by steam distillation, the product is collected by filtration, washed alkali-free, and dried. The condensation product may be represented by the following formula:

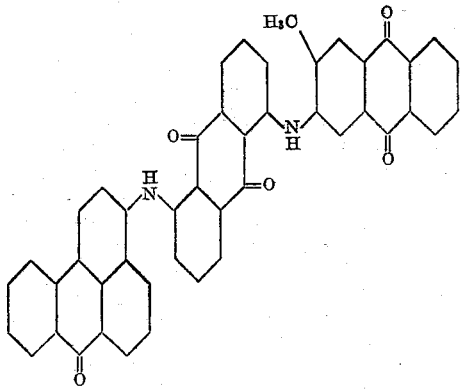

To a melt prepared from 300 parts of potassium hydroxide and 150 parts of methanol heated to 145° C., 60 parts of the above condensation product are added while agitating. After heating two and one-half hours at the above temperature, the mass is poured into 3000 parts of water, stirred overnight, filtered, washed alkali-free, and dried. The product is a black powder soluble in concentrated sulfuric acid with a bright olive-green color. When worked up to a paste by any of the usual methods, e. g., acid pasting or vatting, it dyes cotton from a dull violet-brown vat in gray shades (red cast) of excellent fastness properties.

*Example 2*

A mixture of 1000 parts of nitrobenzene, 200 parts of Bz-1-bromobenzanthrone, 154 parts of 1:5-diaminoanthraquinone, 100 parts of sodium carbonate and 10 parts of copper acetate is heated to 172° C. and maintained for 20 hours. Then 400 parts of nitrobenzene, 200 parts of 1-bromo-2-methylanthraquinone, 100 parts of sodium carbonate and 5 parts of copper acetate are added, and the mixture is heated to 210° C. and maintained at that temperature for 20 hours. The solvent is then removed by steam distillation and the product collected by filtration, washed alkali-free and dried. The condensation product may be represented by the formula:

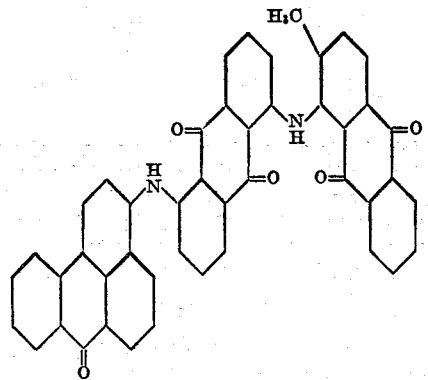

To a fluid melt prepared from 1125 parts of potassium hydroxide and 370 parts of methanol heated to 130° C., 225 parts of the above condensation product are added with stirring. The mass is then heated to 145° C., held at that temperature for three hours and then poured into 8000 parts of water, stirred overnight, filtered, washed alkali-free, and dried. It forms a black powder soluble in concentrated sulfuric acid with an olive-green color. When converted to an aqueous paste it dyes cotton from a dull violet-brown vat in gray shades (green cast) of excellent fastness properties.

*Example 3*

In a mixture of 1088 parts of chlorosulfonic acid, 36 parts of bromine, 36 parts of sulfuryl chloride and 2.7 parts of iodine are dissolved 272 parts of the fusion product as obtained in Example 1. The solution is stirred at 3° to 6° C. for three hours, poured into 10,000 parts of ice and water, filtered and washed acid-free. The product obtained is a black paste, which dyes cotton from a dull violet vat in gray shades much greener than the unhalogenated starting material and shows good fastness properties. On analysis the product is found to contain 8.04% bromine and 2.0% chlorine.

As disclosed by the foregoing examples, the methyl substituent may appear on the terminal anthraquinone radical of the condensation product. The following two examples demonstrate that the methyl group may be a substituent of the central anthraquinone radical of the condensation product.

*Example 4*

A mixture of 150 parts of nitrobenzene, 31 parts of Bz-1-bromobenzanthrone, 25.2 parts of 1:5-diamino-2-methyl-anthraquinone, 15 parts of sodium carbonate and 1.5 parts of copper acetate is heated to 170° C. and maintained at that temperature for 20 hours. Then 100 parts of nitrobenzene, 29 parts of 2-chloroanthraquinone, 10 parts of sodium carbonate and one part of copper acetate are added. The mixture is heated to 210° C. and maintained at this point for 20 hours. The solvent is then removed by steam distillation. The product is collected by filtration, washed alkali-free, and dried. The following formula represents the condensation product formed:

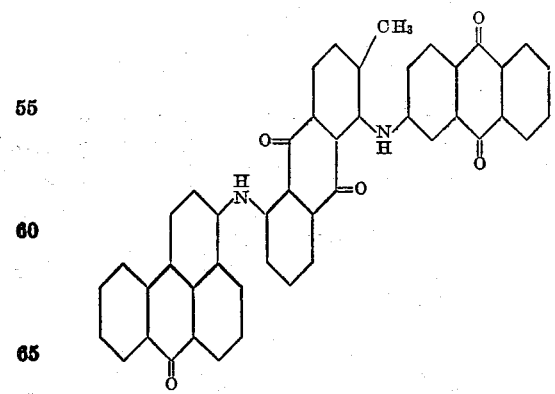

To a melt prepared from 294 parts of potassium hydroxide and 147 parts of methyl alcohol heated to 145° C., 42 parts of the above condensation product are added while agitating. The mass is then held at this temperature for three hours and then poured into 2400 parts of water, stirred overnight, filtered, washed alkali-free, and dried. The product is a black powder soluble in concentrated sulfuric acid with an olive-green color. When worked up to a paste it dyes cotton from a dull violet-brown alkaline hydrosulfite vat in gray shades of good fastness properties.

Example 5

A mixture of 150 parts of nitrobenzene, 31 parts of Bz-1-bromobenzanthrone, 25.2 parts of 1:5-diamino-2-methyl-anthraquinone (containing some 1:8-diamino-2-methyl-anthraquinone), 15 parts of sodium carbonate and 1.5 parts of copper acetate is heated to 170° C. and maintained at that temperature for 20 hours. Then 100 parts of nitrobenzene, 29 parts of 1-chloroanthraquinone, 10 parts of sodium carbonate and one part of copper acetate are added. The mixture is heated to 210° C. and maintained for 20 hours after which it is cooled to 25° C., filtered, washed with nitrobenzene, alcohol, and hot water in turn and dried. The following condensation products are formed:

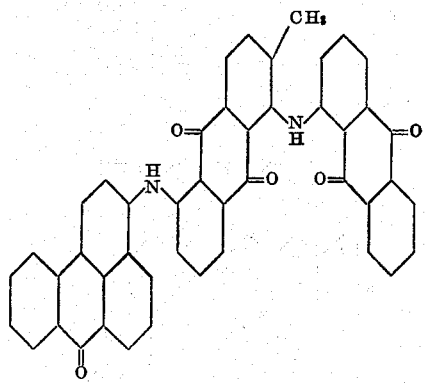

and in a smaller proportion:

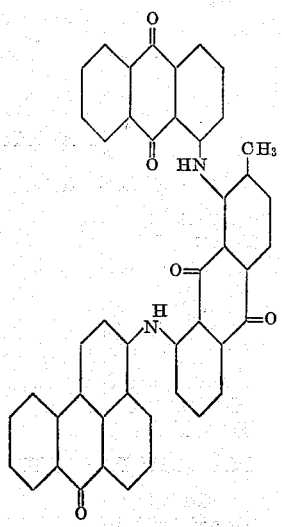

To a melt prepared from 450 parts of potassium hydroxide and 225 parts of methanol heated to 145° C., 65 parts of the above condensation product are added while stirring. The mass is maintained at this temperature for two and one-half hours and then poured into 4000 parts of water, stirred overnight, filtered, washed alkali-free, and dried. It forms a black powder. When vatted with sodium hydrosulfite it forms a dull brown vat from which cotton is dyed in gray shades (with a very brown cast) of good fastness properties.

Example 6

A mixture of 150 parts of nitrobenzene, 31 parts of Bz-1-bromobenzanthrone, 23.8 parts of 1:4-diaminoanthraquinone, 16 parts of sodium carbonate and 1.6 parts of copper acetate is heated to 170° C. and maintained at that temperature for 18 hours. Then 200 parts of nitrobenzene, 31 parts of 2-bromo-3-methylanthraquinone, 10 parts of sodium carbonate and one part of copper acetate are added. The mass is heated to 210° C. and maintained at this point for 20 hours. The mixture is cooled to 25° C., filtered, washed with nitrobenzene, alcohol and hot water in turn, and dried. The condensation product formed has the following chemical structure:

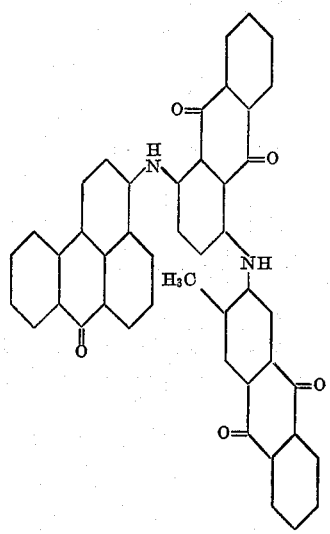

To a melt prepared from 350 parts of potassium hydroxide and 175 parts of methyl alcohol heated to 128° to 130° C., 50 parts of the above condensation product are added while agitating. The mass is held at this temperature for two hours. At this point the first ring closure has taken place. (The product obtained dissolves in concentrated sulfuric acid with an olive-green color, whereas the starting material dissolves with a bright blue color, and dyes cotton from a hydrosulfite vat in gray-brown shades with a very reddish-violet cast, whereas the starting material is hardly vattable and has very little affinity to the fiber.) Thereafter the mass is heated to 158° to 160° C. and maintained at this temperature for three hours. At this point the second ring closure has taken place. The mass is then poured into three liters of waters, stirred overnight, filtered, washed alkali-free, and dried. The product obtained forms a black powder soluble in concentrated sulfuric acid with a brown-violet color. When vatted with sodium hydrosulfite it forms a dull violet-brown vat from which cotton is dyed in gray shades (with an olive-green cast) of good fastness properties.

If the fusion is carried out in the same manner, heating at 150° to 155° C. for three hours, both ring closures occur and the dyestuff results directly.

The fusion products as dyestuffs may be employed directly as obtained or they may be halogenated, e. g., with chlorine or bromine, in the customary manner, for example in organic solvents such as nitrobenzene or in strong mineral acids such as sulfuric or chlorosulfonic acids under moderate conditions to avoid sulfonation of the nucleus.

The vat dyestuffs of this invention dissolve in concentrated sulfuric acid usually with an olive-green color. They afford dull violet to violet-brown shades in alkaline hydrosulfite solutions, and produce gray to olive dyeings of exceedingly good fastness on cotton. They dye equally well by the warm or cold dyeing process and are suitable for machine dyeing.

What is claimed is:

1. A vat dyestuff probably containing two acridine rings obtained by caustic alkali fusion of a compound of the formula:

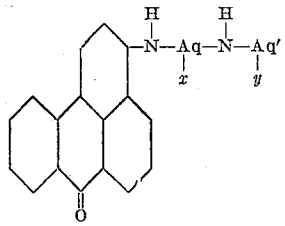

wherein Aq is an anthraquinone radical having the two N-atoms in alpha positions, Aq' is an anthraquinone radical, and $x$ and $y$, which are ortho to the N-atom connecting Aq and Aq', are dissimilar substituents selected from the group consisting of a hydrogen atom and a methyl radical.

2. A vat dyestuff probably containing two acridine rings obtained by caustic alkali fusion of a compound of the formula:

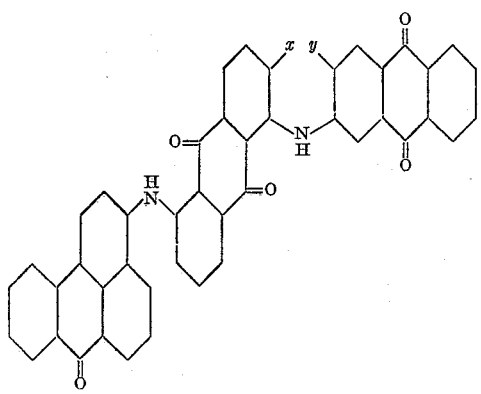

in which $x$ and $y$ are dissimilar substituents selected from the group consisting of a hydrogen atom and a methyl radical.

3. A vat dyestuff probably containing two acridine rings obtained by caustic alkali fusion of a compound of the formula:

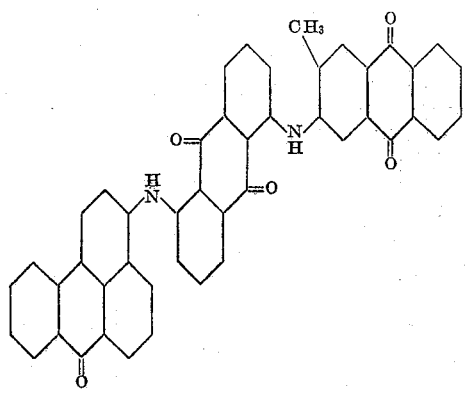

4. A vat dyestuff probably containing two acridine rings obtained by caustic alkali fusion of a compound of the formula:

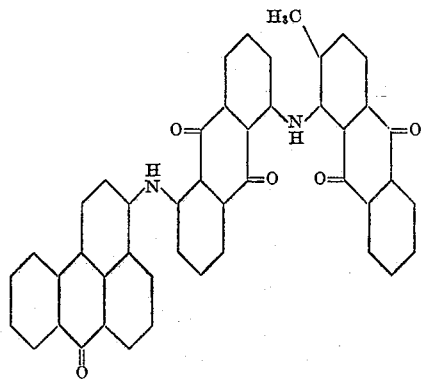

5. A vat dyestuff probably containing two acridine rings obtained by caustic alkali fusion of a compound of the formula:

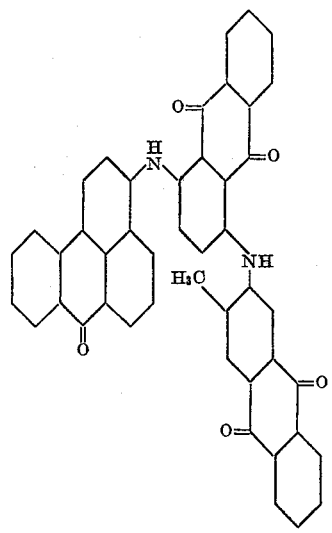

JOSEPH DEINET.

REFERENCES CITED

The following references are of record in the file of this patent:

UNITED STATES PATENTS

| Number | Name | Date |
| --- | --- | --- |
| 1,709,985 | Kranzlein et al. | Apr. 23, 1929 |
| 1,896,435 | Wolff et al. | Feb. 7, 1933 |
| 1,903,181 | Honold et al. | Mar. 28, 1933 |
| 1,931,821 | Heidenreich | Oct. 25, 1933 |
| 1,936,716 | Honold | Nov. 28, 1933 |

FOREIGN PATENTS

| Number | Country | Date |
| --- | --- | --- |
| 467,919 | Great Britain | June 25, 1937 |

OTHER REFERENCES

Hewitt, "Synthetic Colouring Matters," Longmans, Green & Co.; New York, 1922, pages 192 and 193.